April 30, 1968  J. CZETLI  3,380,597

SAMPLE WEIGHING DEVICE

Filed March 1, 1966

INVENTOR
Jess Czetli

United States Patent Office 3,380,597
Patented Apr. 30, 1968

3,380,597
SAMPLE WEIGHING DEVICE
Jess Czetli, West Pikeland Township, Chester County, Pa., assignor to The Alan I W Frank Corporation, Pittsburgh, Pa., a corporation of Pennsylvania
Filed Mar. 1, 1966, Ser. No. 530,977
6 Claims. (Cl. 214—2)

ABSTRACT OF THE DISCLOSURE

A sample weighing device comprising a rotary carrier, a sample container, means on the rotary carrier for releasably holding the sample container, a scale, means for driving the rotary carrier, means for stopping the rotary carrier when the sample container is atop the scale, means for releasing the sample container to seat upon the scale and means for dumping the contents of the sample container when the sample container is not atop the scale. The dumping means may include a pinion on the rotary carrier meshing with a fixed gear segment for turning the rotary carrier about a horizontal axis during its rotary movement. Means may be provided for tilting the rotary carrier when it is stopped with the sample container atop the scale to lower the sample container toward the scale. The rotary carrier may seat on a generally horizontal circular track having a section mounted separately from the remainder of the track and means may be provided for lowering that section to tilt the rotary carrier to lower the sample container toward the scale when the rotary carrier is seated on that section of the track and is stopped with the sample container atop the scale. Means may be provided to actuate the means for releasing the sample container upon tilting the rotary carrier to lower the sample container toward the scale.

---

Figure 1:
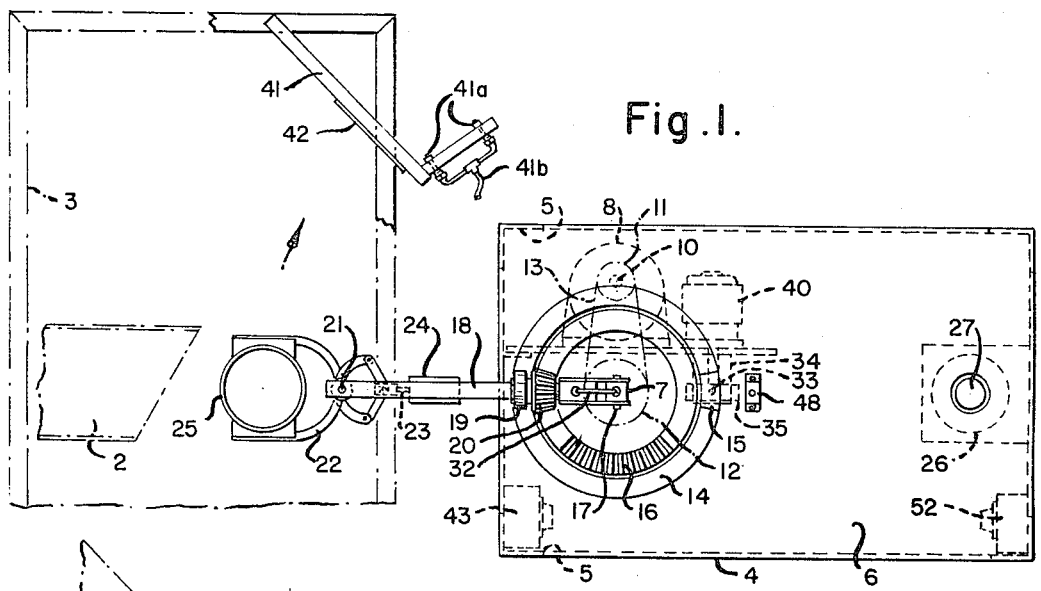

This invention relates to a sample weighing device and more particularly to a device for automatically periodically taking a sample of material utilized in a manufacturing process and weighing the sample for the purpose of determining the bulk density of the material.

My sample weighing device has utility in many fields; indeed in any field in which bulk density control is important. Purely by way of explanation and illustration I shall describe my sample weighing device as employed in the automatic periodic weighing of samples of particles of a synthetic thermoplastic substance, such, for example, as expanded polystyrene beads formed by subjecting to controlled heat beads of expandable polystyrene impregnated with a gas which under the application of heat causes the particles to expand, the extent of expansion increasing with increase in temperature. Articles such as drinking cups may be formed in suitably shaped molds equipped with heating and cooling means by introducing the expanded polystyrene beads into the molds, applying heat to transform the expanded polystyrene beads into shapes determined by the conformation of the molds and cooling the shapes. It is important to control the bulk density of the expanded polystyrene beads for control of quality and uniformity of the products.

My sample weighing device is designed to be utilized as a part of control means in a continuous process of the type above referred to. The particles or beads to be weighed may be caused to flow continuously in such manner that a sample container may be moved into position to be filled with the flowing particles and then into position to be weighed. Means not forming part of my invention may be employed with my sample weighing device to adjust or correct the bulk density of the material.

I provide a sample weighing device comprising a rotary carrier, a sample container, means on the rotary carrier for releasably holding the sample container, a scale, means for driving the rotary carrier, means for stopping the rotary carrier when the sample container is atop the scale and means for releasing the sample container to seat upon the scale. Means are provided for dumping the contents of the sample container when the sample container is not atop the scale.

My sample weighing device may comprise a rotary carrier having tongs at the end thereof, a sample container adapted to be gripped by the tongs, a scale, means for driving the rotary carrier, means for stopping the rotary carrier when the sample container is atop the scale and means for opening the tongs to release the sample container to seat upon the scale and for closing the tongs to grip the sample container.

An excess material scraper for levelling the sample material at the rim of the container may be provided, which scraper may be disposed in the path of the rim of the container and may be yieldably mounted to ride over the rim of the container.

Means may be provided including a pinion on the rotary carrier meshing with a fixed gear segment for turning the rotary carrier about a horizontal axis during its rotary movement to dump its contents. Means may also be provided for tilting the rotary carrier when it is stopped with the sample container atop the scale to lower the sample container toward the scale.

The rotary carrier may seat on a generally horizontal circuit track having a section mounted separately from the remainder of the track, and means may be provided for lowering that section to tilt the rotary carrier to lower the sample container toward the scale when the rotary carrier is seated on that section of the track and is stopped with the sample container atop the scale. Means are provided to actuate the means for releasing the sample container upon tilting the rotary carrier to lower the sample container toward the scale.

In a preferred form my sample weighing device comprises a generally vertical shaft, a generally horizontal carrier pivoted to the upper portion of the generally vertical shaft by a generally horizontal pivot, a sample container, means on the carrier for releasably holding the sample container, a scale, means for rotating the shaft, means for stopping rotation of the shaft when the sample container is atop the scale, a generally horizontal circular track on which the carrier seats, the track having a section mounted separately from the remainder of the track, means for lowering that section to tilt the carrier about the generally horizontal pivot to lower the sample container toward the scale when the carrier is seated on that section of the track and is stopped with the sample container atop the scale and means for releasing the sample container to seat upon the scale.

Other details, objects and advantages of the invention will become apparent as the following description of a present preferred embodiment thereof proceeds.

Figure 2:
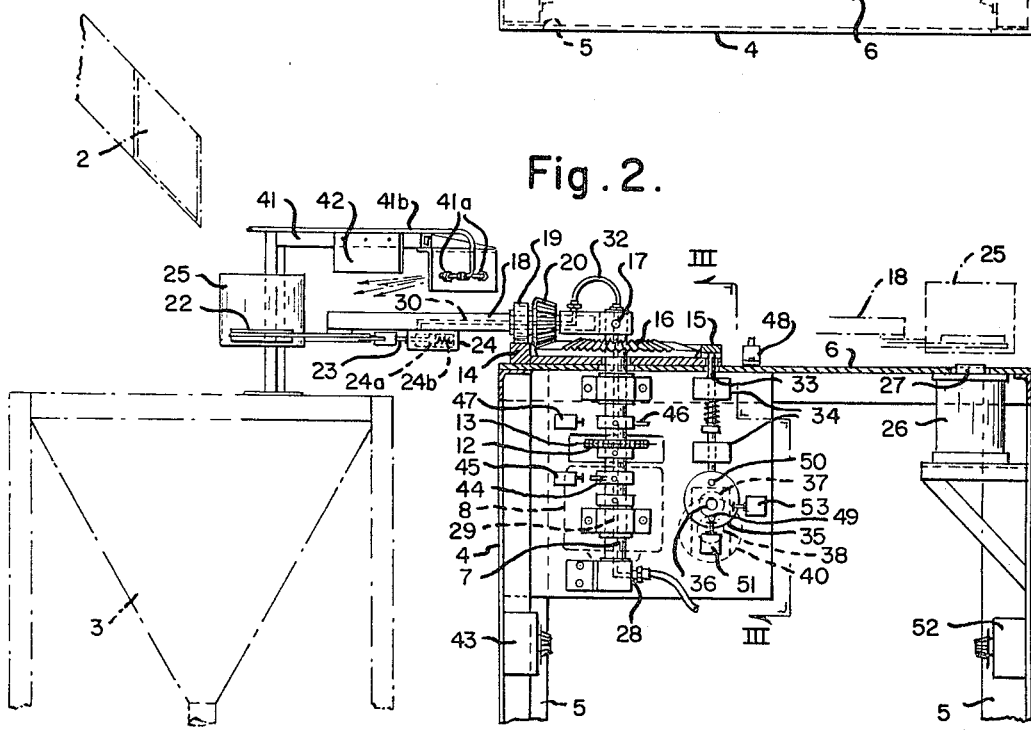
Figure 3:
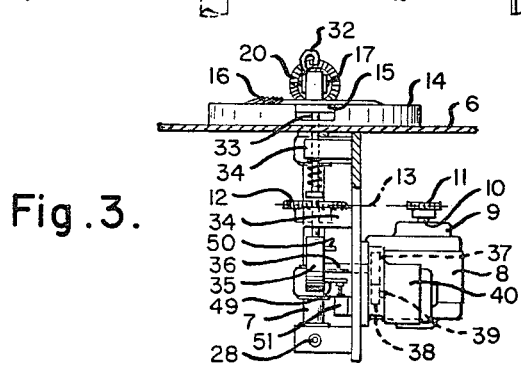

In the accompanying drawings I have shown a present preferred embodiment of the invention in which FIGURE 1 is a top plan view of my sample weighing device;

FIGURE 2 is a view partly in elevation and partly in vertical cross-section of the sample weighing device shown in FIGURE 1; and FIGURE 3 is a fragmentary cross-sectional view to enlarged scale taken on the line III—III of FIGURE 2.

Referring now more particularly to the drawings, there is shown a portion of apparatus for controllably expanding expandable polystyrene beads with a mixture of steam and air for use in producing molded articles such as drinking cups by the process above referred to. The apparatus includes a chute 2 through which the beads are discharged into a receptacle 3 from which they may pass to molding apparatus. The discharge of the beads from the chute 2 affords ready means for taking samples of the beads to determine their bulk density.

I provide a stand designated generally by reference numeral 4 having legs 5 and a top 6. A vertical shaft 7 is mounted for rotation in the stand with its upper portion projecting through the top 6 of the stand and its lower portion extending below the top of the stand. Carried by the stand underneath the top 6 is a main electric motor 8 which through a gear reducer 9 drives a vertical shaft 10 carrying a sprocket 11. The shaft 7 carries a sprocket 12, and a sprocket chain 13 meshes with the sprockets 11 and 12 whereby the motor 8 is adapted to rotate the shaft 7.

Mounted atop the stand is a circular horizontal track 14 which is stationary except for a short section 15 which is mounted for vertical movement as will presently be described. Concentric with the track 14 and disposed at the inside of the track is a bevel gear segment 16. Pivoted to the top of the shaft 7 by a horizontal pivot 17 is a generally horizontally extending arm 18 carrying a roller 19 adapted to roll on the track 14–15. The arm 18 also carries a bevel pinion 20 adapted to mesh with the bevel gear segment 16 for a purpose presently to be described.

Pivoted to the arm 18 at 21 are a pair of tongs 22 operated by a rod 23 which carries a piston 24a operable in a cylinder 24 mounted on the under side of the arm 18. A compression coil spring 24b acts between the piston 24a and the closed end of the cylinder 24 normally urging the rod 23 outwardly to move the tongs 22 to open or inoperative position. A sample container in the form of a cup 25 is adapted to be releasably gripped by the tongs 22. The stand 4 carries a weighing scale 26 having a platform 27 on which the cup 25 is adapted to be seated to determine the weight of the cup and its contents, the platform 27 being in a circular path described by the cup during a cycle of operation as will presently be explained.

Fluid under pressure is delivered to the cylinder 24 through an inlet 28, a bore 29 in the shaft 7, a bore 30 in a portion of the arm 18 and a flexible tube 32 to close the tongs 22 when the cup 25 is to be gripped.

The section 15 of the track 14 is carried by a vertical rod 33 mounted for vertical movement in a guide 34 and whose bottom rests on an eccentric 35 carried by a horizontal shaft 36, which shaft also carries a gear 37. The gear 37 meshes with a gear 38 carried by a horizontal shaft 39 driven through suitable reduction gearing by a drop motor 40. Thus operation of the motor 40 rotates the eccentric 35 which controls the vertical position of the section 15 of the track 14.

A horizontal arm 41 stationarily mounted on any suitable support and shown in FIGURES 1 and 2 as being mounted on the receptacle 3 extends generally radially of the axis of the shaft 7 above the top of the cup 25 and carries an excess material scraper 42 which is disposed in the path of the rim of the cup and is yieldably mounted to ride over the rim of the cup. The arm 41 carries jets or nozzles 41a through which compressed air is ejected to blow excess beads off of the exterior of the cup after the cup has been filled and levelled. Compressed air is delivered to the jets or nozzles 41a through a tube 41b.

Mounted on the stand 4 is a timer 43 which determines the frequency with which samples are taken and initiates each cycle of the device. For example, the timer 43 may be set to initiate a cycle of operation of the device every ten minutes.

A cycle of operation of the device begins with the cup 25 gripped by the tongs 22 disposed above the scale platform 27 but with the track section 15 in its uppermost position so that the cup, filled with beads, just having been weighed, is not seated on the scale platform. Operation of the timer 43 starts the main motor 8 which through the sprocket drive above described turns the shaft 7. This causes the arm 18 to move about the axis of the shaft 7 toward the bevel gear segment 16, the roller 19 riding on the track 14. As the bevel pinion 20 reaches the bevel gear segment 16 the pinion meshes with the gear segment causing rotation of the arm 18 about its own axis through one complete rotation and dumping the contents of the cup 25 into the receptacle 3. The length of the bevel gear segment 16 is such that the cup after dumping its contents is returned to upright position. As rotation of the shaft 7 continues the cup passes under the chute 2 which fills it with beads. The filled cup passes under the excess material scraper 42 which levels the beads in the cup to the cup rim, insuring an exact volume of beads to be weighed.

The shaft 7 carries an eccentric 44 which operates a switch 45 after the beads have been levelled to admit compressed air to the jets on the arm 41 and blow excess beads off the exterior of the cup 25.

Projecting from the shaft 7 is a pin 46 which when the cup 25 has reached a position directly over the scale platform 27 operates a switch 47 to stop the main motor 8 and start the drop motor 40. Stopping of the main motor 8 stops the cup directly over the scale platform. Operation of the drop motor 40 results in lowering of the section 15 of the track 14 and downward pivotal movement of the arm 18 about the axis of the pin 17. This moves the cup 25 downwardly toward the scale platform 27. Just as the cup 25 reaches the scale platform 27 a switch 48 contacted by the cylinder 24 upon downward movement thereof operates valve means to cut off fluid pressure to the cylinder and exhaust the fluid from the cylinder, whereupon the spring 24b moves the piston 24a to the left viewing FIGURES 1 and 2 which opens the tongs 22 and seats the cup 25 on the scale platform 27.

Projecting from the eccentric 35 are two pins, a longer pin 49 and a shorter pin 50. The longer pin 49 actuates a switch 51 which activates the scale to weigh the cup 25 and its contents. The time during which the cup 25 is seated on the scale platform 27 is determined by a timer 52 which may be set at any time desired. The timer 52 is activated by the pin 50 engaging a switch 53. Operation of that switch also stops the drop motor 40.

When the timer 52 times out the drop motor restarts, raising the arm 18 and activating the tongs to clamp the cup, raising the cup from the scale platform. The parts have thus returned to their position at the beginning of the cycle.

Thus samples are automatically taken at predetermined intervals and each sample is weighed to determine whether there should be any adjustment of the bulk density of the material. By appropriate adjustment of the timer 43 the interval at which samples are taken and weighed may be altered at will.

While I have shown and described a present preferred embodiment of the invention it is to be distinctly understood that the invention is not limited thereto but may be otherwise variously embodied within the scope of the following claims.

I claim:

1. A sample weighing device comprising a rotary carrier, a sample container, means on the rotary carrier for releasably holding the sample container, a scale, means for driving the rotary carrier, means for stopping the rotary carrier when the sample container is atop the scale, means for releasing the sample container to seat upon the scale and means for dumping the contents of the sample container when the sample container is not atop the scale.

2. A sample weighing device as claimed in claim 1 having means including a pinion on the rotary carrier meshing with a fixed gear segment for turning the rotary carrier about a horizontal axis during its rotary movement to dump its contents.

3. A sample weighing device comprising a rotary carrier, a sample container, means on the rotary carrier for releasably holding the sample container, a scale, means for driving the rotary carrier, means for stopping the rotary carrier when the sample container is atop the scale, means for releasing the sample container to seat upon the scale and means for tilting the rotary carrier when it is stopped with the sample container atop the scale to lower the sample container toward the scale.

4. A sample weighing device as claimed in claim 3 in which the rotary carrier seats on a generally horizontal circular track having a section mounted separately from the remainder of the track and means are provided for lowering that section to tilt the rotary carrier to lower the sample container toward the scale when the rotary carrier is seated on that section of the track and is stopped with the sample container atop the scale.

5. A sample weighing device as claimed in claim 4 in which means are provided to actuate the means for releasing the sample container upon tilting the rotary carrier to lower the sample container toward the scale.

6. A sample weighing device comprising a generally vertical shaft, a generally horizontal carrier pivoted to the upper portion of the generally vertical shaft by a generally horizontal pivot, a sample container, means on the carrier for releasably holding the sample container, a scale, means for rotating the shaft, means for stopping rotation of the shaft when the sample container is atop the scale, a generally horizontal circular track on which the carrier seats, the track having a section mounted separately from the remainder of the track, means for lowering that section to tilt the carrier about the generally horizontal pivot to lower the sample container toward the scale when the carrier is seated on that section of the track and is stopped with the sample container atop the scale and means for releasing the sample container to seat upon the scale.

References Cited

UNITED STATES PATENTS

| 1,247,903 | 11/1917 | Thornbaugh | 177—145 XR |
| 1,766,574 | 6/1930 | Westin et al. | 214—1 |
| 2,038,458 | 4/1936 | Von Segebaden et al. | 177—145 |
| 3,091,903 | 6/1963 | Kammerer | 53—253 XR |

FOREIGN PATENTS

| 531,038 | 8/1931 | Germany. |
| 1,150,826 | 6/1963 | Germany. |

GERALD M. FORLENZA, *Primary Examiner.*

F. E. WERNER, *Assistant Examiner.*

UNITED STATES PATENT OFFICE
CERTIFICATE OF CORRECTION

Patent No. 3,380,597                      April 30, 1968

Jess Czetli

It is certified that error appears in the above identified patent and that said Letters Patent are hereby corrected as shown below:

Column 2, line 29, "circuit" should read -- circular --.

Signed and sealed this 9th day of September 1969.

(SEAL)
Attest:

Edward M. Fletcher, Jr.
Attesting Officer

WILLIAM E. SCHUYLER, JR.
Commissioner of Patents